United States Patent
Xue et al.

(10) Patent No.: US 8,631,296 B2
(45) Date of Patent: Jan. 14, 2014

(54) AUTOMATIC RETRANSMISSION CONTROLLER AND RETRANSMISSION BLOCK RECOMBINATION APPARATUS

(75) Inventors: Jinyin Xue, Beijing (CN); Jianming Wu, Kawasaki (JP); Jun Tian, Beijing (CN)

(73) Assignee: Fujitsu Limited, Kawasaki (JP)

( * ) Notice: Subject to any disclaimer, the term of this patent is extended or adjusted under 35 U.S.C. 154(b) by 1113 days.

(21) Appl. No.: 12/491,804

(22) Filed: Jun. 25, 2009

(65) Prior Publication Data

US 2009/0327831 A1    Dec. 31, 2009

(30) Foreign Application Priority Data

Jun. 30, 2008 (CN) .......................... 2008 1 0127487

(51) Int. Cl.
*G08C 25/02* (2006.01)
(52) U.S. Cl.
USPC ........... 714/748; 714/749; 714/750; 714/751; 714/758; 714/807
(58) Field of Classification Search
None
See application file for complete search history.

(56) References Cited

U.S. PATENT DOCUMENTS

| | | | |
|---|---|---|---|
| 5,629,948 A | | 5/1997 | Hagiwara et al. |
| 6,445,717 B1* | | 9/2002 | Gibson et al. .................. 370/473 |
| 7,152,196 B2 | | 12/2006 | Wu et al. |
| 7,685,504 B2* | | 3/2010 | Obuchi et al. .................. 714/790 |
| 2002/0150040 A1* | | 10/2002 | Tong et al. ..................... 370/216 |
| 2007/0061690 A1 | | 3/2007 | Stewart et al. |
| 2007/0234186 A1 | | 10/2007 | Mo et al. |
| 2007/0280158 A1 | | 12/2007 | Qiu et al. |
| 2008/0244352 A1* | | 10/2008 | Kwon et al. ................... 714/748 |
| 2008/0282125 A1* | | 11/2008 | Hafeez et al. .................. 714/748 |
| 2009/0044065 A1* | | 2/2009 | She et al. ........................ 714/748 |
| 2009/0103480 A1* | | 4/2009 | Tong et al. ..................... 370/328 |
| 2009/0313516 A1* | | 12/2009 | Shin et al. ...................... 714/748 |

FOREIGN PATENT DOCUMENTS

| | | | |
|---|---|---|---|
| CN | 1385982 A | 12/2002 | |
| CN | 101385269 A | 3/2009 | |
| JP | 738540 | 2/1995 | |
| JP | 2000244461 | 9/2000 | |
| JP | 2005503692 | 2/2005 | |
| JP | 2006245912 | 9/2006 | |
| WO | 2007078219 A1 | 7/2007 | |
| WO | WO 2007078219 A1 * | 7/2007 | ................ H04L 1/18 |

OTHER PUBLICATIONS

3G TR 25.835 V1.0.0 (Sep. 2000) 3rd Generation Partnership Project; Technical Specification Group Radio Access Network; Report on Hybrid ARQ Type II/III (Release 2000).

(Continued)

*Primary Examiner* — Albert Decady
*Assistant Examiner* — Justin R Knapp
(74) *Attorney, Agent, or Firm* — Smith, Gambrell & Russell, LLP

(57) ABSTRACT

This invention proposes an automatic retransmission controller and a retransmission block recombination apparatus, of which the automatic retransmission controller comprises a responsive reception unit that receives the information fed back from the receiver; a retransmission judging unit that determines coded data blocks to be retransmitted according to the information received by the responsive reception unit; and a data acquisition unit that acquires a part of data in each of the coded data blocks to be retransmitted judged by the retransmission judging unit for recombination to form a retransmission coded block, when the number of the coded data blocks to be transmitted is more than one.

9 Claims, 10 Drawing Sheets

(56) References Cited

OTHER PUBLICATIONS

C. Bai, B. Mielczarek, W.A. Krzymien, and I.J. Fair "Sub-Block Recovery Scheme for Iterative Decoding of Turbo Codes" in Proc. IEEE VTC'05-Fall, Dallas, USA, Sep. 2005.

Tao Shi; Lei Cao "Combining Techniques and Segment Selective Repeat on Turbo Coded Hybrid ARQ", in Proc. IEEE Conf. WCNC. 2004 IEEE, Vo.4, pp. 2115-2119, Mar. 21-25, 2004.

First Office Action of the Chinese Patent Application No. 200810127487.4 dated May 3, 2012.

Notification of the Second Office Action dated Aug. 21, 2012 received in Chinese Application No. 200810127487.4.

Japanese Office Action dated Aug. 27, 2013 received in Japanese Patent Application No. 2009-156212.

Japanese Office Action dated Oct. 29, 2013 received in Patent Application No. 2009-156212.

* cited by examiner

AUTOMATIC RETRANSMISSION CONTROLLER AND RETRANSMISSION BLOCK RECOMBINATION APPARATUS

FIELD OF THE INVENTION

The present invention relates to transmission technology in communications systems, and more particularly to an automatic retransmission controller and a retransmission block recombination apparatus in the Hybrid Automatic Retransmission reQuest (HARQ) technology.

BACKGROUND OF THE RELATED ART

With the increasing demand on high-rate wireless multimedia services and the increasing scarcity of wireless spectral resources, research on future highly-efficient mobile communications system will become more and more significant and meaningful. In order to overcome influences of wireless mobile channel time-varying and multipath fading on signal transmission, error control methods such as forward error correction (FEC) coding and automatic retransmission request (ARQ) are introduced to reduce error rate of the system and ensure quality of service. Although the time delay in FEC scheme is small, code redundancy present therein reduces system throughput. Although an ideal throughput can be achieved in ARQ when there is not much error rate, time delay generated in ARQ is relatively great, thereby making it unsuitable in providing real-time services. To overcome the deficiencies of the two schemes, incorporation of the two methods engenders the Hybrid Automatic Retransmission reQuest (HARQ) scheme: i.e. an FEC subsystem is contained in the ARQ system, whereby when error correcting capability of the FEC is capable of correcting the errors, the ARQ is not used; and only when it is impossible for the FEC to properly correct errors, the retransmission of the erroneous codes is requested via the ARQ feedback channel. Effective incorporation of ARQ with FEC not only provides higher reliability than in the case of the single FEC system but also provides higher system throughput than in the case of the single ARQ system. Accordingly, with the rapid development of higher data rate or higher reliability for services, HARQ has become an essential technique in wireless communications system and has been studied in-depth.

Classification of HARQ Technology

According to different classification modes, HARQ can be classified into synchronous HARQ technique and asynchronous HARQ technique, non-adaptive HARQ technique and adaptive HARQ technique, and into different retransmission types and retransmission mechanisms.

Synchronous HARQ technique and asynchronous HARQ technique: HARQ can be classified into synchronous type and asynchronous type according to timings at which retransmissions occur. Since the occurring timing of transmission is known to the receiving end in advance in synchronous HARQ, the serial number of HARQ process can be obtained from the subframe number. Transmission of asynchronous HARQ process can occur at any timing, and the processing serial number of HARQ process should be transmitted together with the data. Although asynchronous adaptive HARQ technique has higher flexibility than synchronous non-adaptive technique in terms of scheduling, less signaling cost is required in the latter.

Retransmission types: according to different contents to be retransmitted, HARQ mainly includes three types of hybrid automatic retransmission request mechanisms, which are respectively referred to as HARQ-I, HARQ-II and HARQ-III. FEC coding and CRC check are performed in all three types in common, FEC decoding and CRC check are performed at the receiving end, and retransmission is requested in case of error in the packets. The three types differ from one another as follows: in HARQ-I erroneous packets are discarded, packets to be retransmitted are the same as the already transmitted packets, and there is no combination decoding; in HARQ-II erroneous packets are not discarded but decoded in combination with the retransmitted packets, and the packets to be retransmitted may differ from the already transmitted packets both in format and in content; since CPC codes (complementary punctured convolutional codes) are employed in HARQ-III, each transmitted packet and each retransmitted packet can be decoded by itself, and each retransmission may generate different redundancies (different bit puncturing) and may also generate identical redundancies (identical FEC), in which case the operation is similar to that in HARQ-I, but erroneous packets should be stored at the receiving end to facilitate incorporation with the packets to be retransmitted.

Adaptive and non-adaptive: HARQ can be further classified as non-adaptive type and adaptive type according to whether data characteristics change during retransmission, wherein data characteristics as transmitted include assignment of resource blocks, mode of modulation, length of transmission block and duration of transmission. Adaptive transmission means that the transmitting end can change partial transmission parameters in accordance with practical channel status information during each process of retransmission. Accordingly, the control signaling information that contains transmission parameters should be transmitted together during each round of transmission, thus causing additional signaling cost. Changeable transmission parameters include mode of modulation, assignment of resource units and duration of transmission, etc. However, these transmission parameters are known to the receiving end in advance in the non-adaptive system, so that signaling is relatively simple.

Three standard protocols in the traditional automatic retransmission request (ARQ) are SAW (stop-and-wait) ARQ, GBN (go-back-n) ARQ, and SR (selective repeat) ARQ. ARQ and HARQ can both be used either in an FDD system or in a TDD system.

In a general HARQ system, when the receiving end detects an erroneous data packet, the failed bits usually occupy only a part of the data packet, so that retransmission of the entire data packet will engender certain loss to the throughput. Both the long term evolution (LTE) of 3GPP and the enhanced type (802.16m) of the WiMAX system select HARQ-II and III as optional solutions. When the first attempt of decoding fails, the transmitter adds redundant information or processes again for transmission, the retransmitted packet is not completely identical with the originally transmitted packet, and incorporation of the retransmission information with previously received data packets will get better system throughput.

FIG. 1 is a view schematically illustrating the structure of a HARQ system. As shown in FIG. 1, the HARQ system comprises a transmitting unit 100, an ARQ controller 101, a modulation and coding scheme (MCS) controller 102, a wireless channel 103, a channel estimator 104, a receiving unit 105, a modulation and coding scheme selector 106, and an ARQ check 107. In addition, data cache and reception cache are usually included. The data cache is used to temporarily store data to be transmitted or data already transmitted but not checked as correct, and the reception cache is used to temporarily store received data. The data cache, transmitting unit, ARQ controller, and MCS controller as shown in FIG. 1 constitute the transmitter section of the HARQ system. The transmitter can for instance be a base station (node B) in a wireless communications system, and can also be a server in a general network (such as the Internet or an LAN). The channel estimator 104, receiving unit 105, modulation and coding scheme selector 106, ARQ check 107, and the reception cache as shown in FIG. 1 constitute the receiver section of the HARQ system. The receiver can for instance be a mobile station in a wireless communications system, and can also be a personal computer connected to a server in the Internet or an LAN. In other words, the HARQ system as shown in FIG. 1 can be applied in a wireless communications network, and can also be applied in a wired network. The HARQ system can for instance be applied in the TCP/IP network.

The general processing procedure of the HARQ system is explained below with reference to FIG. 1.

Firstly at the initial state, the transmitting unit 100 at the transmitter section (transmitting end) modulates and codes data to be transmitted in the data cache in accordance with modulation and coding information provided by the MCS controller 102, and transmits via an antenna, for instance, new data packets generated by modulating and coding the data to be transmitted.

The receiving unit 105 at the receiver section (receiving end) receives the data transmitted by the transmitting unit 100 via the channel 103, and the received data is performed with CRC check by the ARQ check unit 107. If it is checked as correct, the correctly received data bits are outputted, and an ACK signal is returned to the ARQ controller 101 at the transmitting end; otherwise, a NACK (also referred to as NAK) signal is returned, and information (such as bit soft information) of the current data packet is retained in the reception cache. At the same time, the MCS controller 106 at the receiving end determines the modulation and coding scheme by calculating such parameters as the effective signal-to-noise ratio in accordance with the result of channel estimation, and feeds back the same to the MCS controller 102. Feedbacks of MCS and ACK/NACK signals are two independent branches, and the feedback frequencies thereof can either be identical with or different from each other depending upon system setup or channel environment. When the receiver returns to the initial state, the data is coded and modulated in accordance with the feedback MCS.

Thereafter at the transmitter section, upon receipt of the ACK feedback or NACK feedback returned from the ARQ check unit, the ARQ controller firstly determines whether the received feedback is ACK or NACK. If what is received is ACK, the initial state is returned, and the data is coded and modulated in accordance with the feedback MCS to continue transmission of new data packets. If what is received is NACK, the number of retransmission is added by 1, and when the number of retransmission does not exceed the preset maximum number of retransmission, the data packets transmitted last time are transmitted again. The format of the retransmitted data packets (such as the coding and modulation mode, and sizes of the data packets, etc.) can either be the same as that during the first transmission (namely Chase Combining) or selected as a new packet format in accordance with the latest MCS feedback (namely IR incremental redundancy mode of HARQ-III type). When the number of retransmission reaches an upper limit, the initial state is returned to continue transmission of new data packets.

Upon receipt of the retransmitted data packet, the receiver section incorporates the new information with information retained in the reception cache to decode again (incorporation of the retransmitted data information with the retained information can effectively reduce error rate and enhance throughput). The decoded data is performed with CRC check, and the check result is then fed back (as ACK/NACK) to the transmitting end.

As can be seen, the transmitting end transmits new data only when the ARQ controller 101 receives the ACK signal or the maximum retransmission number is reached. Thus, the transmitting end and the receiving end both require certain cache space to store the data not correctly transmitted.

FIG. 2 is a view schematically illustrating HARQ data frames and the time sequence of retransmission. In the example as shown in FIG. 2, each data frame includes a plurality of data packets (4 data packets in the example as shown). The receiving end (receiver section) feeds back one CRC check result to the transmitter section (transmitting end) for each data packet. In the example as shown in FIG. 2, of the four data packets P1, P2, P3 and P4 as initially transmitted, P1 and P4 are known for instance through CRC check to have been correctly received, so that feedbacks with regard to them are ACK. Whereas feedbacks to P2 and P3 that have not been correctly received are NACK. Consequently, as shown in FIG. 2, data packets P2 and P3 are retransmitted in the next frame, while other positions in the frame can be used to transmit new data packets (new data packets P5 and P6 as shown in FIG. 2). T as shown in FIG. 2 is the length of the data frame, and Td indicates inter-frame space.

As can be seen from FIGS. 1 and 2, in the conventional technology, the HARQ system carries out retransmitting process on the entire data packets (PDU) of the MAC layer, and each retransmission occupies relatively great channel resources.

The data packets are performed with CRC check as a whole at the receiving end in the general HARQ retransmission mechanism, whereas situation in the practical system might be that only few bits are erroneous, so that retransmission of the entire (or partial) packets occupies considerable channel resources. A retransmission method based on coded block has been proposed to further improve HARQ performance. In this method one data packet consists of several coded blocks carrying their own check codes, and data retransmission takes the coded block as the minimum unit.

FIG. 3 is a schematic view illustrating the structure of a data packet according to the technical solution of coded block retransmission. The structure of the data packet as shown in FIG. 3 is merely exemplary in nature, as it may include more or less coded blocks. As shown in FIG. 3, the data packet 401 (also referred to as Transport Block, TB) in the frame includes several (four as schematically shown in FIG. 3) coded blocks 402 each carrying a CRC check code 403. After passing through the coder, one source data sub-packet corresponds to a combination of a coded block and a CRC check code. The whole data packet can be finally added with a CRC check code 404, and can also not be added with the check code. The receiving end checks each coded block, and if there is an error, only the erroneous coded block is retransmitted in the next packet of data, while other coded blocks can be placed with new data, thus avoiding the problem of having to retransmit the entire data packet in the general HARQ technology.

In the technical solution based on coded block retransmission, the coded blocks replace the entire data packet as the minimum unit for retransmission, thereby greatly improving system throughput. However, a coded block can reach as much as 6144 bits in the 3GPP LTE system, and this means the load of retransmission is still burdensome.

As should be noted, the above explanations to the conventional technologies are merely to facilitate lucid and complete explanations to the technical solution of the present invention, and to facilitate comprehension by persons skilled in the art.

These technical solutions should not be regarded to have been publicly known to persons skilled in the art only because they have been explained in the Background of the Related Art in the present invention.

Reference documents relevant to the present invention are listed below and incorporated herein by reference, as if they were described in detail in the present Description.

1. [Patent Document 1]: Wu, et al., Adaptive multi-mode HARQ system and method (U.S. Pat. No. 7,152,196 B2);
2. [Patent Document 2]: Stewart, et al., Block puncturing for turbo code based incremental redundancy (US 20070061690 A1);
3. [Patent Document 3]: Mo, et al., Packet transmission apparatus and method using optimized punctured convolution codes (US 20070234186 A1);
4. [Patent Document 4]: Qiu, et al., Wireless terminal turbo decoding module supporting packet splitting and decoding (US 20070280158 A1);
5. [Non-Patent Document 1]: 3GPP TR25.835. Report on hybrid ARQ type II/III [S]. 2000;
6. [Non-Patent Document 2]: C. Bai, B. Mielczarek, W. A. Krzymie'n, and I. J. Fair, "Sub-block recovery scheme for iterative decoding of turbo codes" in Proc. IEEE VTC'05-Fall, Dallas, USA, September 2005;
7. [Non-Patent Document 3]: Tao Shi; Lei Cao, "Combining techniques and segment selective repeat on turbo coded hybrid ARQ", in Proc. IEEE Conf. WCNC. 2004 IEEE, Vol. 4, pp. 2115-2119, 21-25 Mar. 2004.

SUMMARY OF THE INVENTION

The present invention is proposed in view of the aforementioned defects existent in the conventional technology to remove one or more defects caused by limitation in the prior art, or to provide at least one advantageous choice.

In order to achieve the above objectives, the present application provides the following aspects.

Aspect 1: An automatic retransmission controller used in a transmitter in an automatic retransmission system including the transmitter and a receiver, said transmitter transmitting to the receiver a frame including a plurality of data packets, each said data packet including one or more coded data blocks, each said coded data block having check for the coded data block itself, said receiver determining whether each said coded data block is correctly received based on said check and feeding back an information showing whether the coded data blocks are correctly received, said automatic retransmission controller comprising: a responsive reception unit that receives the information fed back from the receiver; a retransmission judging unit that determines coded data blocks to be retransmitted according to the information received by the responsive reception unit; and a data acquisition unit that acquires a part of data in each of the coded data blocks to be retransmitted judged by the retransmission judging unit for recombination to form a retransmission coded block, when the number of the coded data blocks to be retransmitted is more than one.

Aspect 2: The automatic retransmission controller according to Aspect 1, characterized in that the data acquisition unit acquires a half, one third or a quarter of the data from each of the coded data blocks to be retransmitted, so as to form the retransmission coded block.

Aspect 3: The automatic retransmission controller according to Aspect 1, characterized in that proportions of the data acquired by the data acquisition unit from each of the coded data blocks to be retransmitted to the corresponding data block are not completely identical with each other.

Aspect 4: The automatic retransmission controller according to Aspect 1, characterized in that the receiver further feeds back an information on the reception reliability for each part of coded blocks which have not been correctly received and need to be retransmitted; the data acquisition unit acquires the part of the coded data blocks in need to be retransmitted which has not been reliably received according to the reception reliability, so as to form the retransmission coded block.

Aspect 5: The automatic retransmission controller according to Aspect 1, characterized in that said automatic retransmission controller further comprises a format notification unit that notifies the receiver of the parts of the coded data blocks extracted and combination mode of these parts.

Aspect 6: The automatic retransmission controller according to Aspect 1, characterized in that said transmitter and receiver operate in TDD mode or FDD mode.

Aspect 7: The automatic retransmission controller according to Aspect 1, wherein said coded data block is coded according to turbo code, convolution code or LDPC code.

Aspect 8: The automatic retransmission controller according to Aspect 1, wherein said data acquisition unit acquires different parts of each of the coded data blocks to be retransmitted according to the number of the coded data blocks to be retransmitted and the length of each of the coded data blocks to be retransmitted.

Aspect 9: The automatic retransmission controller according to Aspect 1, wherein said data acquisition unit further acquires new data to be transmitted, and said transmitter codes the new data to form a new coded block, and modulates and transmits the new coded block and the retransmission coded block.

Aspect 10: The automatic retransmission controller according to Aspect 1, wherein said data acquisition unit acquires source data of each said coded data block to be retransmitted, a coder of said transmitter codes the source data to re-acquire each said coded data block to be retransmitted, and said data acquisition unit extracts each said re-acquired coded data block to be retransmitted, so as to obtain a part of the data of the coded data block to be retransmitted.

Aspect 11: The automatic retransmission controller according to Aspect 1, wherein said data acquisition unit acquires each said coded data block to be retransmitted as stored, so as to acquire a part of the data of the coded data block to be retransmitted.

Aspect 12: An automatic retransmission controller used in a transmitter in an automatic retransmission system including the transmitter and a receiver, said transmitter transmitting to the receiver a frame including a plurality of data packets, each said data packet having check for the data packet itself, said receiver determining whether each said data packet is correctly received based on said check and feeding back an information showing whether the data packets are correctly received, said automatic retransmission controller comprising: a responsive reception unit that receives the information fed back from the receiver; a retransmission judging unit that determines data packets to be retransmitted according to the information received by the responsive reception unit; and a data acquisition unit that acquires a part of data in each of the data packets to be retransmitted judged by the retransmission judging unit for combination to form a retransmission data packet, when the number of the data packets to be retransmitted is more than one.

Aspect 13: A retransmission block recombination apparatus used in a receiver in an automatic retransmission system including a transmitter and the receiver, said transmitter transmitting to the receiver a frame including a plurality of data packets, each data packet including one or more coded data blocks, one or more of said one or more coded data blocks is retransmitted coded block which includes a part of data of each of the coded data blocks to be retransmitted as indicated by the receiver, said receiver receiving the frame transmitted from the transmitter, said retransmission block recombination apparatus comprising: a retransmission part determination unit that determines which part in the received frame includes the retransmitted coded block, and determines each part of the retransmitted coded block corresponds to which part of the coded data blocks to be retransmitted; and an incorporation unit that incorporates each part of the retransmitted coded block and the corresponding part of the coded data blocks to be retransmitted stored in a storage unit based on determination result of said retransmission part determination unit.

Aspect 14: An automatic retransmission controlling method used in a transmitter in an automatic retransmission system including the transmitter and a receiver, said transmitter transmitting to the receiver a frame including a plurality of data packets, each said data packet including one or more coded data blocks, each said coded data block having check for the coded data block itself, said receiver determining whether each said coded data block is correctly received based on said check and feeding back an information showing whether the coded data blocks are correctly received, said automatic retransmission controlling method comprising: a responsive receiving step that receives the information fed back from the receiver; a retransmission judging step that determines coded data blocks to be retransmitted according to the information received in the responsive receiving step; and a data acquiring step that acquires a part of data in each of the coded data blocks to be retransmitted judged in the retransmission judging step for recombination to form a retransmission coded block, when the number of the coded data blocks to be transmitted is more than one.

These and other aspects and features of the present invention will become clearer with reference to the following descriptions and accompanying drawings. Specific embodiments of the present invention are disclosed in detailed in the following descriptions and accompanying drawings to specify modes to which the principles according to the present invention are applicable. As should be noted, the present invention is not restricted in scope thereby, as the present invention subsumes various modifications, variations and equivalences within the scope of the spirits and provisos covered in the attached claims.

Features described and/or illustrated with regard to one embodiment can be used in the same or similar manner in one or more other embodiments, be combined with features of other embodiments, or replace features of other embodiments.

As should be noted, the term of "including/comprising" as used in this paper indicates existence of a feature, an integral part, a step or a component part, but it does not exclude the existence or addition of one or more other features, integral parts, steps or component parts.

Many aspects of the present invention can be better understood with reference to the following drawings. Component parts in the drawings are not drawn in proportion, but merely indicate principles of the present invention. In order to facilitate illustration and description of certain sections of the present invention, corresponding sections in the drawings may be enlarged, i.e. made bigger than other component parts in a schematic apparatus actually fabricated according to the present invention. Elements and features illustrated in one Figure or one embodiment can be combined with elements and features illustrated in one or more of other Figures or embodiments. Moreover, similar reference numerals in the drawings indicate corresponding component parts illustrated in several Figures, and can also indicate corresponding component parts employed in more than one embodiment.

EXPLANATIONS OF THE ACCOMPANYING DRAWINGS

Preferred embodiments of the present invention are shown in the drawings, and they constitute a part of the Description and are employed together with literal wordings to further enunciate the principles of the present invention. In the drawings.

EMBODIMENTS OF THE INVENTION

The method and apparatus according to the present invention are described below with reference to the accompanying drawings and taking a general single-antenna communications system as example. As should be noted, the present invention can be applied to a single-antenna communications system, and can likewise be applied in an MIMO-OFDM multi-antenna system or a CDMA system. The present invention is also applicable to the general Internet data retransmission.

Figure 4:
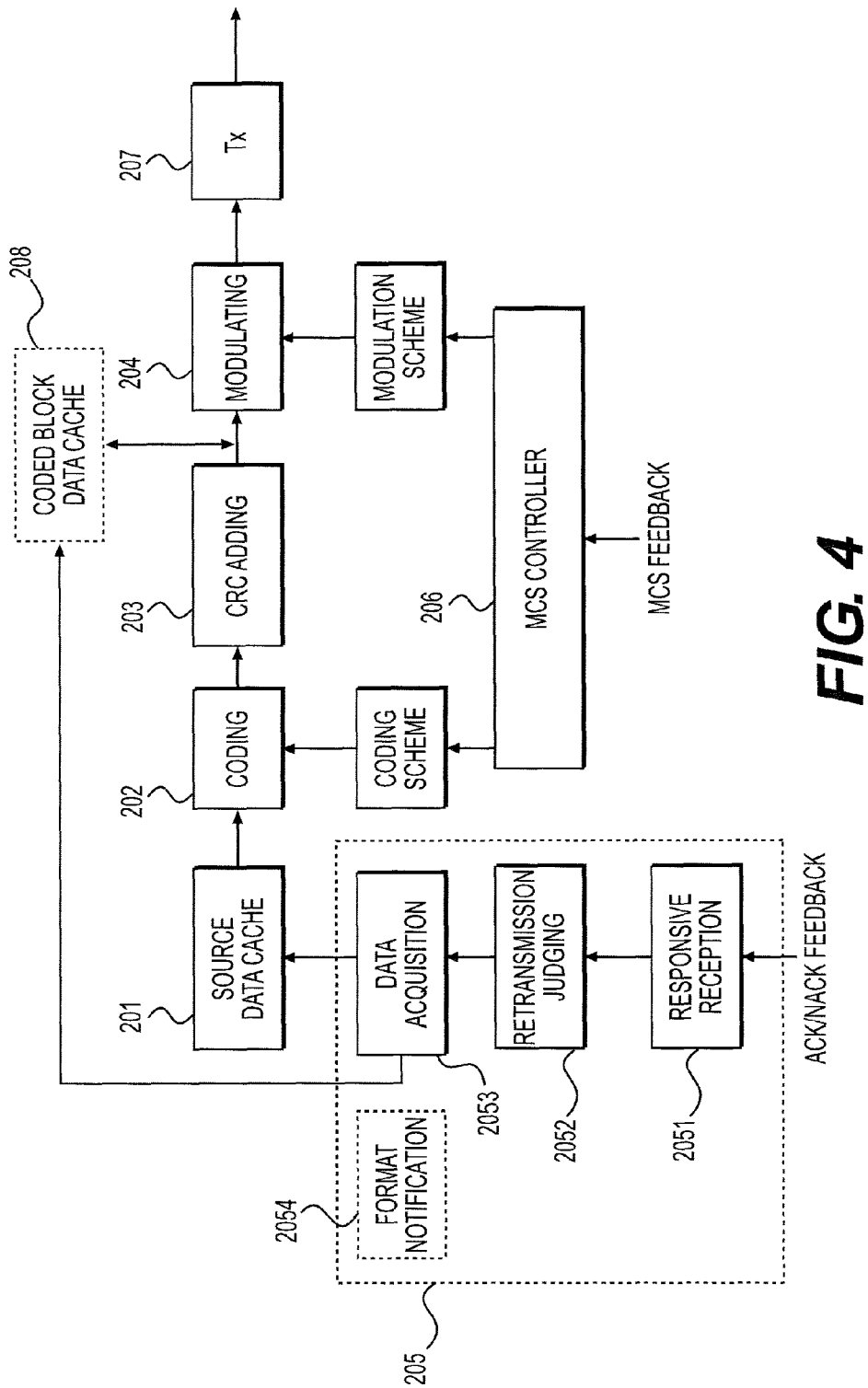
FIG. 4 is a structural view illustrating the HARQ transmitter according to one embodiment of the present invention.

FIG. 4 is a structural view schematically illustrating the transmitter according to one embodiment of the present invention. As shown in FIG. 4, the transmitter according to one embodiment of the present invention includes a source data cache unit 201, a coding unit 202, a CRC adding unit 203, a modulating unit 204, a transmission antenna (Tx) 207, a coded block data cache unit 208, an MCS controller 206 and an ARQ controller 205, of which the ARQ controller 205 includes a responsive reception unit 2051, a retransmission judging unit 2052, a data acquisition unit 2053 and a format notification unit 2054. The coded block data cache unit 208 and/or the format notification unit 2054 may be omitted in different embodiments of the present invention.

Figure 5:
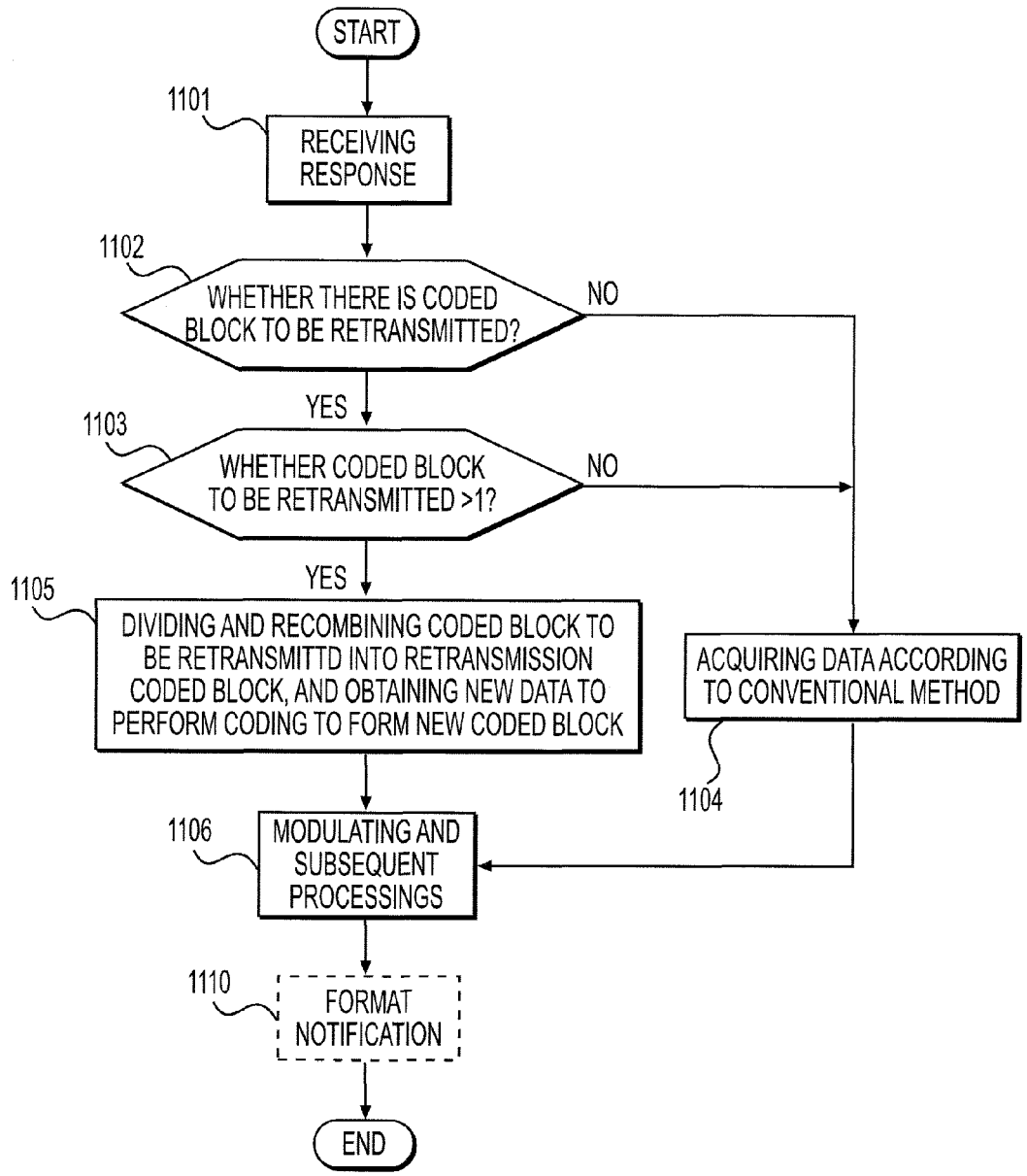
FIG. 5 is a flowchart schematically illustrating the retransmission processing method at the transmitter according to one embodiment of the present invention.

FIG. 5 is a flowchart schematically illustrating the retransmission processing method at the transmitter according to one embodiment of the present invention. Processing at the transmitter according to one embodiment of the present invention is described below with reference to FIGS. 4 and 5.

Firstly in Step 1101, the responsive reception unit 2051 of the ARQ controller 205 receives ACK/NACK feedback information from the receiver.

Figure 1:
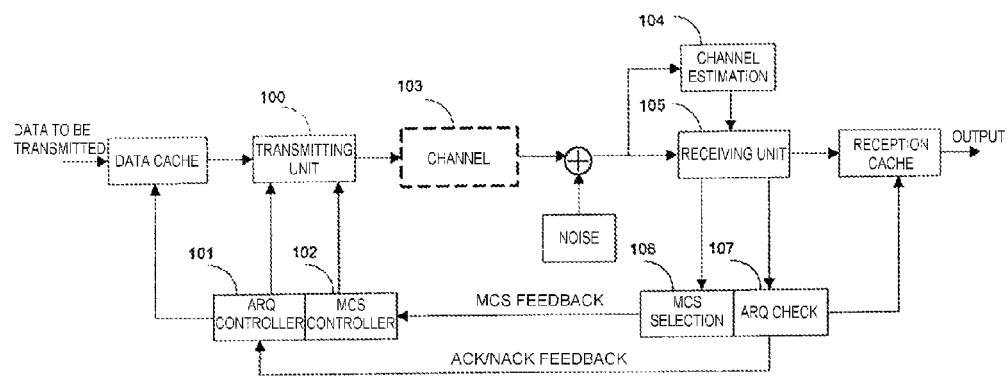
FIG. 1 is a view schematically illustrating the structure of a HARQ system.
Figure 2:
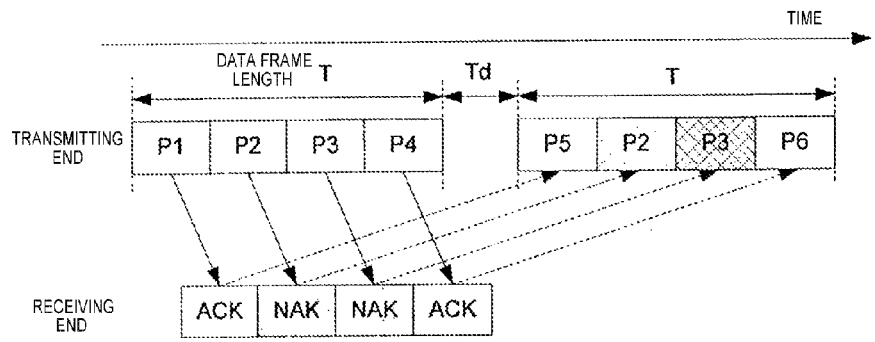
FIG. 2 is a view illustrating data frames and the time sequence of retransmission of a general HARQ system.
Figure 3:
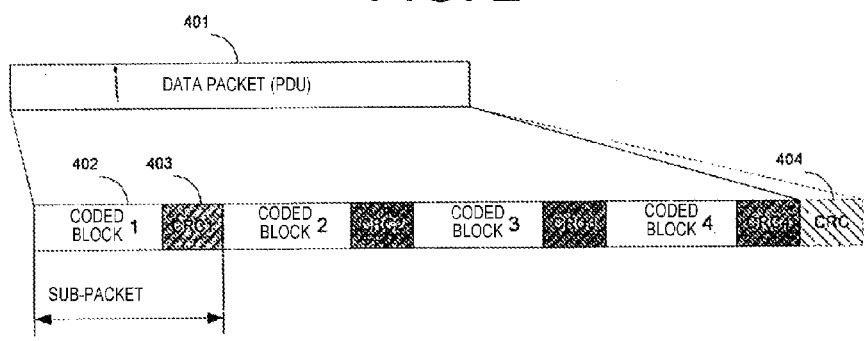
FIG. 3 is a view illustrating the structure of a data packet according to the technical solution of coded block retransmission.

Format of the ACK/NACK feedback information is agreed upon by the receiving and transmitting parties. For instance, with regard to the circumstance in which one frame includes four data packets and each data packet includes four sub-packets as shown in FIGS. 2 and 3, a word of sixteen bits can be used to feed back ACK and NACK signals according to one embodiment. The first four bits indicate the four sub-packets of the first data packet, the subsequence four bits indicate the four sub-packets of the second data packet, the following four bits indicate the third data packet, and the last four bits indicate the fourth data packet. As regards the first four bits, if the first bit is 1, this indicates that the first sub-packet in the first data packet is erroneous, and if the first bit is zero, this indicates the first sub-packet in the first data packet is correctly received. If the second bit is 1, this indicates that the second sub-packet in the first data packet is erroneous, and if the second bit is zero, this indicates the second sub-packet in the first data packet is correctly received, and so on.

Various states can be predefined and numbered according to another embodiment. The receiver transmits the numbers, and the transmitter determines the erroneous packet and sub-packet in accordance with the numbers received from the receiver.

After the responsive reception unit 2051 receives the ACK/NACK feedback information in Step 1101, it is judged in Steps 1102 and 1103 by the retransmission judging unit 2052 whether there is coded block to be retransmitted and whether there are more than one coded blocks. It is possible to determine whether there is coded block to be retransmitted and to determine the position and number of the coded block(s) to be retransmitted in accordance with the agreed information format or numbered numbers as previously mentioned. When there is no coded block to be retransmitted or the number of the coded block to be retransmitted is 1, the data acquisition unit 2053 performs conventional data acquisition processing in Step 1104.

Figure 6:
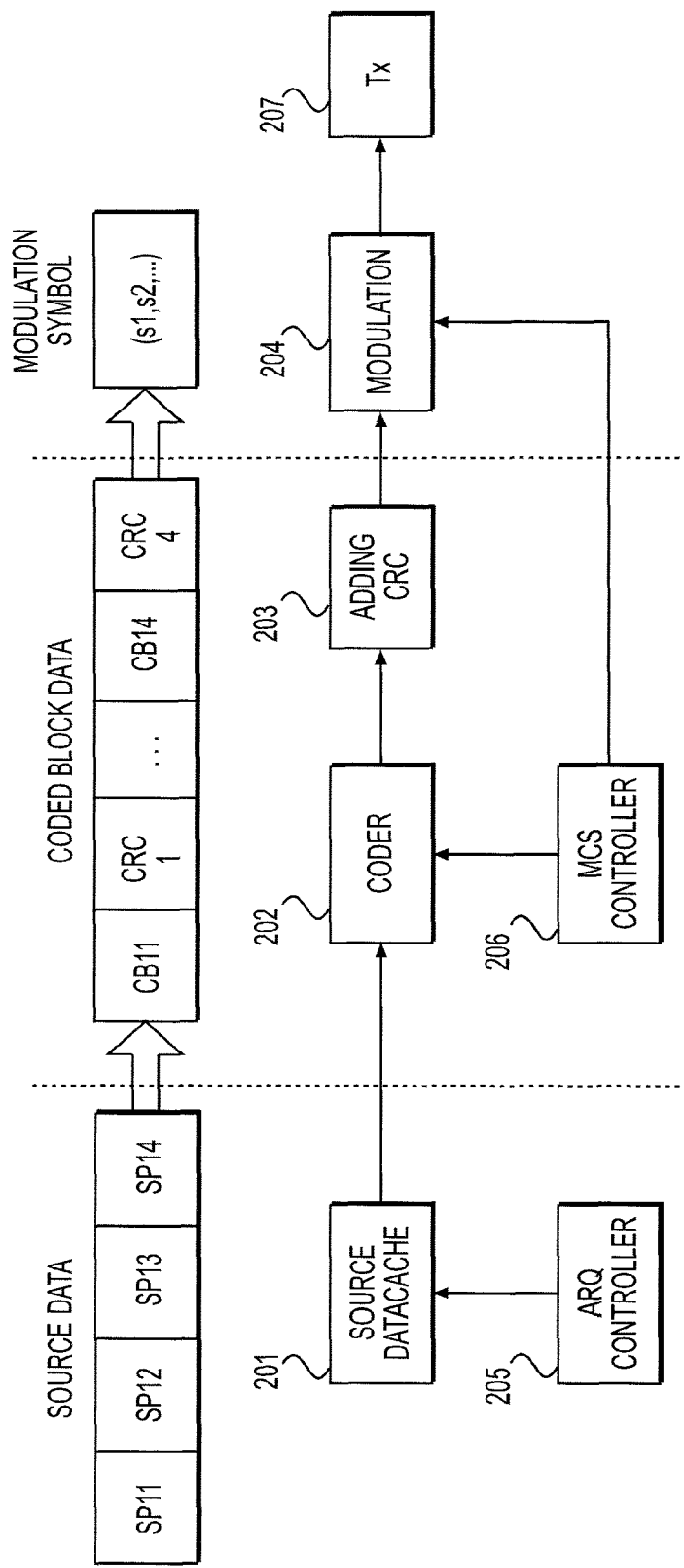
FIG. 6 is a view schematically illustrating data acquisition and coding process in the absence of retransmitted data.

FIG. 6 is a view schematically illustrating data acquisition and coding process in the absence of data coded block to be retransmitted. In FIG. 6, corresponding data structure is indicated above the function block diagram, and resource blocks occupied by the data packet transmitted each time are stationary, including four coded blocks. As shown in FIG. 6, when there is no coded block to be retransmitted, the data acquisition unit 2053 acquires new data from the source data cache 201. The acquired data is divided into a plurality of sub-packets (SP11-SP14, where SPij indicates the jth sub-packet of the ith transmission; the same below), and is then supplied to the coder 202, which codes the sub-packets in accordance with the coding scheme generated by the MCS controller 206 to generate coded blocks (CB11-CB14, where CB11 is the bit serial number of the coded SP11, and CBij indicates the jth coded block of the ith transmission). In the following description, the sub-packet SP means the source bit data before coding, the coded block CB means the bit data after coding, one sub-packet corresponds to one coded block after passing through the coder, and the coded block may also mean the coded block and its combination with CRC according to context. The data is decoded at the receiving end in unit of coded block. The CRC adding unit then adds CRC check codes (CRC1-CRC4) for each coded block. The data having been added with the check code then enters the modulator 204. In the presence of the coded block data cache unit 208, the data having been added with the check code is simultaneously supplied to the coded block data cache unit 208 for storage therein. The modulator 204 modulates the data in accordance with the modulation scheme determined by the MCS controller 206 to generate a modulated symbol sequence, which is sent to the transmission antenna 207 for transmission processing (Step 1106). At this time, previously transmitted coded blocks as stored are not extracted from the coded block data cache unit 208.

Figure 7:
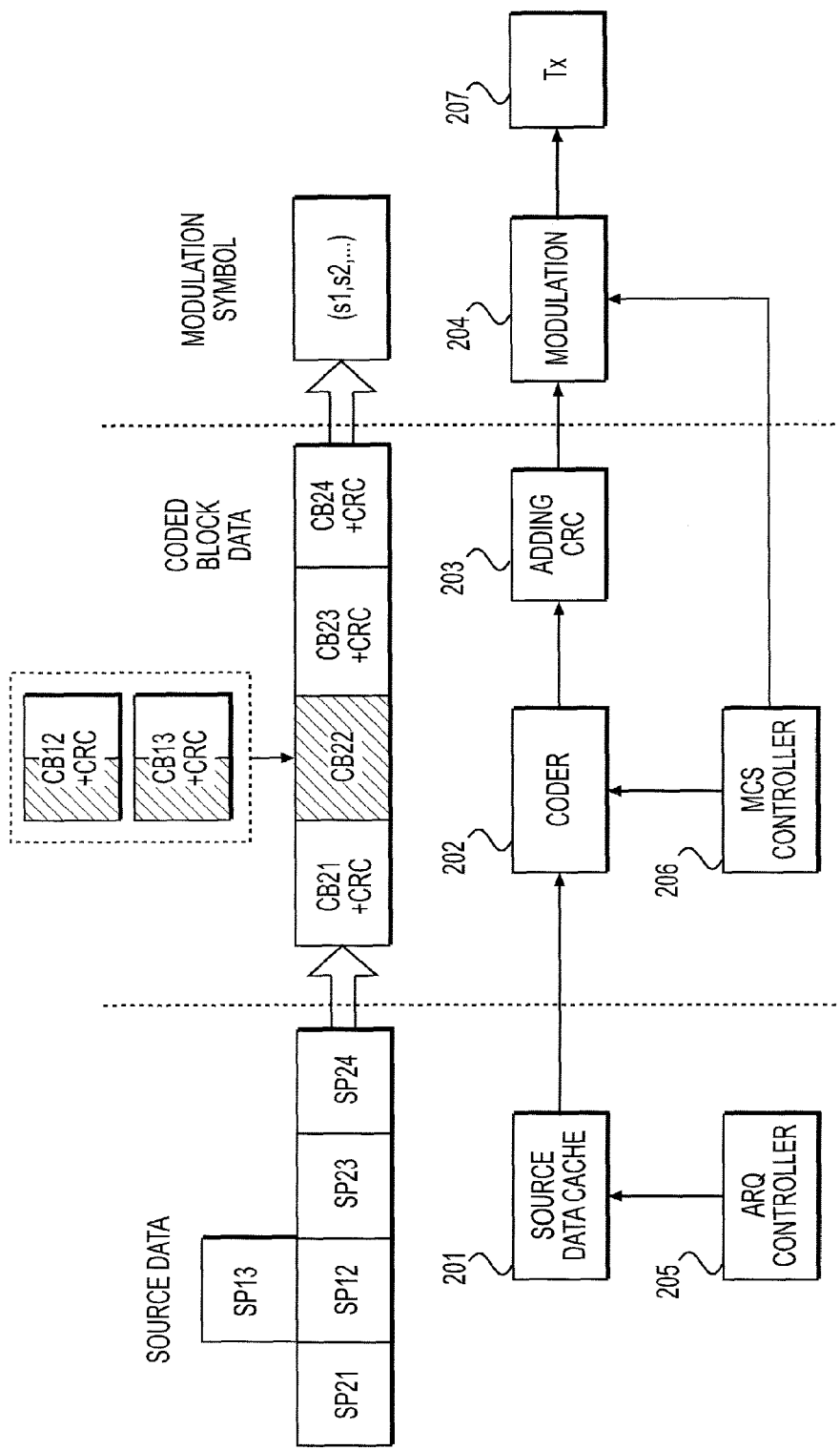
FIG. 7 is a view illustrating acquisition of retransmitted data from a cache of the source data as well as the coding process thereof.
Figure 8:
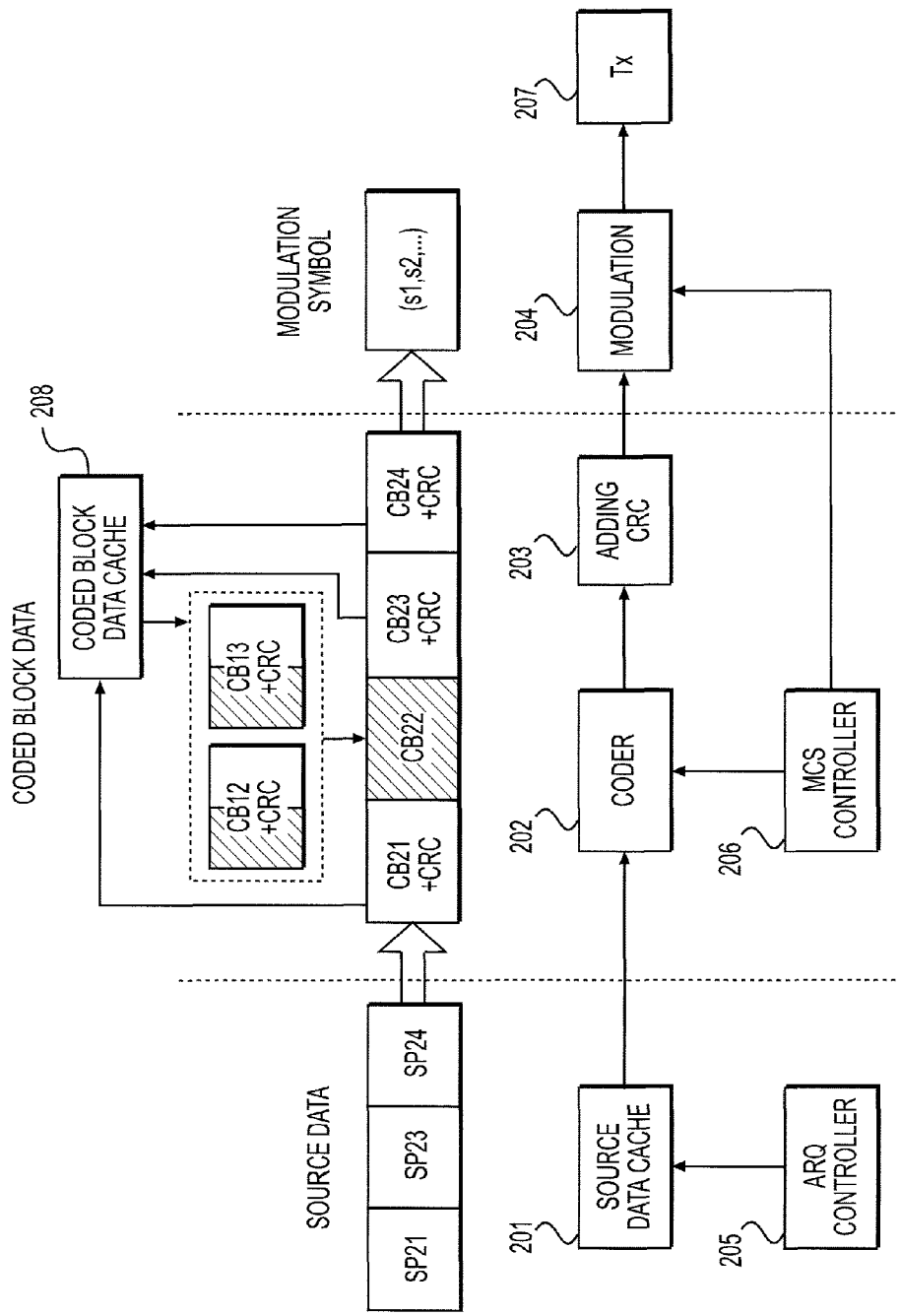
FIG. 8 is a view illustrating acquisition of retransmitted data from a cache of the coded block data as well as the coding process thereof.

FIGS. 7 and 8 show two methods for generating retransmitted data in the presence of data blocks to be retransmitted, namely two processing methods for Step 1105. As previously mentioned, the coded block data cache unit 208 stores the bit sequence of the coded data plus check codes of the current frame. Accordingly, in the embodiment with the coded block data cache unit 208, if there is data to be retransmitted, it suffices to extract the corresponding data coded block(s) from the coded block data cache unit 208. When retransmission is required in the absence of the coded block data cache unit 208, it is necessary for the transmitting end to read again the source data sub-packets to be retransmitted from the source data cache unit 201 and to code them again. FIGS. 7 and 8 respectively show the processing procedures of extracting data to be retransmitted from the source data cache unit 201 and the coded block data cache unit 208. In FIG. 7, two sub-packets SP12 and SP13 to be retransmitted are extracted again from the source data cache unit 201, and coded again to generate CB12 and CB13 which are then respectively added with CRC, and these are divided and recombined to form new a new coded block CB22. In FIG. 8, these data are obtained from the coded block data cache unit 208, and this saves the coding procedure of the data blocks to be retransmitted, but requires more cache space. The coded block data cache unit 208 stores a series of data blocks not modulated and not determined as to whether they have been correctly received. If all data transmitted last time return ACK signals, the coded block data cache unit 208 deletes the stored corresponding data.

Figure 12:
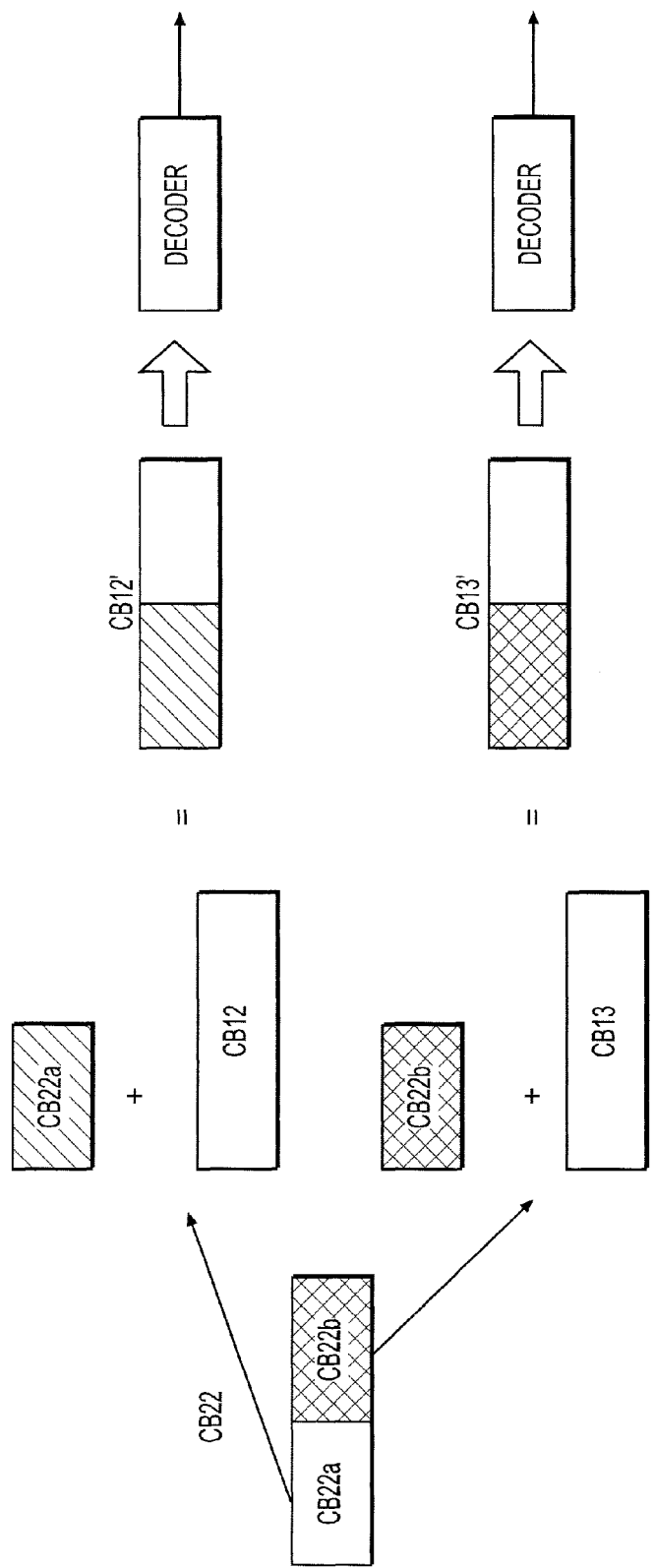
FIG. 12 is a view illustrating incorporation of a divided and retransmitted coded block at the receiving end.

FIG. 8 schematically illustrates data acquisition and coding process when more than one data coded blocks should be retransmitted in the presence of the coded block data cache unit 208 according to one embodiment of the present invention. As shown in FIG. 8, when two data blocks CB12 and CB13 (whose corresponding source data sub-packets are respectively SP12 and SP13) fail at the first transmission and should hence be retransmitted, the data acquisition unit 2053 acquires new data of three sub-packets (SP21, SP23, SP24) from the source data cache unit 201, supplies them to the coder 203, adds CRC therewith, and stores the current new coded data block in the coded block data cache unit 208. Two blocks CB12 and CB13 as well as CRC thereof to be retransmitted are then extracted from the coded block data cache unit 208, and parts of each of them are taken to form a new coded block, which is referred to as CB22. CB12 and CB13 are data with their CRC check codes, and when they constitute CB22, MCS is not changed, and length of the coded blocks is also not changed, as the division and recombination merely involve placing of partial bit data of CB12 or CB13 to a specific position of CB22. For example, CB12={x1,x2,x3,x4}, CB13={y1,y2,y3,y4} are combined into CB22={x1,y1,x3,y4}. In the divided and retransmitted blocks, CRC is processed the same as the data bits are processed. Thus, the four coded blocks of the data transmitted in the second frame are {CB21,CB22,CB23,CB24}, where CB21, CB23 and CB24 are new coded blocks, and CB22 is the retransmitted coded block that contains parts of each of the erroneous blocks CB12 and CB13 (respectively expressed as CB22a and CB22b, as shown in FIG. 12).

Through division and recombination, it is possible to reduce the number of the retransmitted coded blocks to be less than the number of the coded blocks not correctly received as determined in accordance with the feedback of the receiving end.

Figure 9:
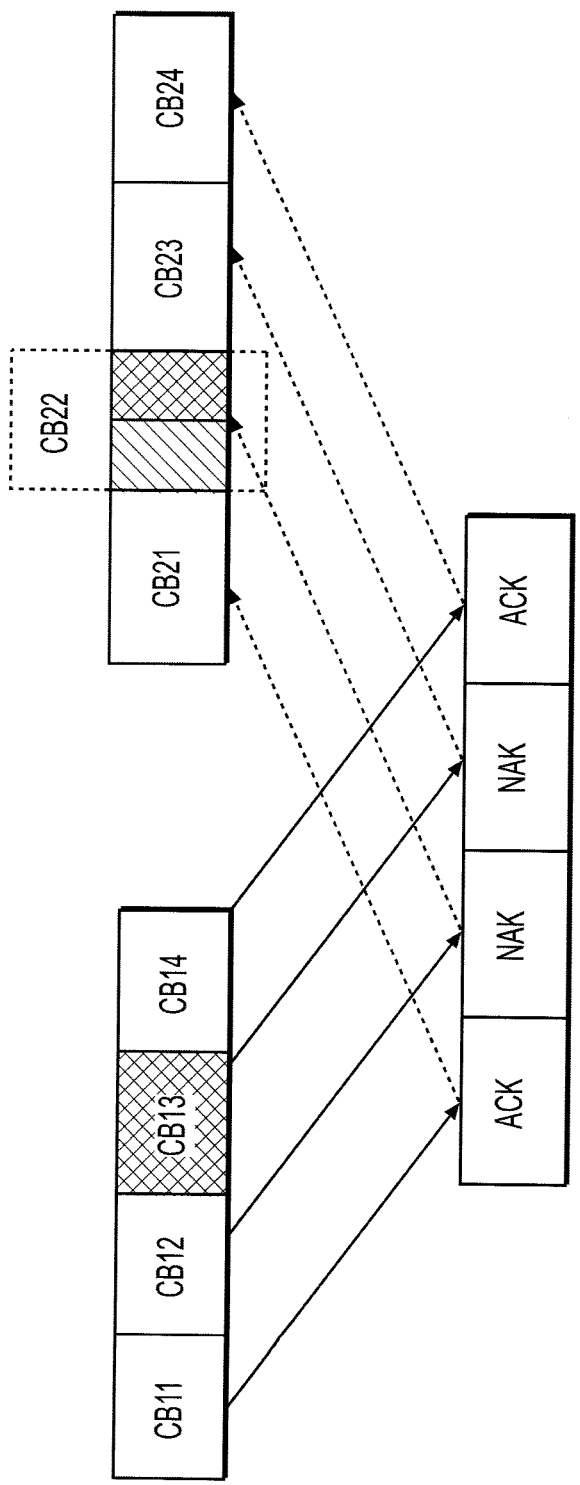
FIG. 9 is a view schematically illustrating division and recombination according to one embodiment of the present invention.

FIG. 9 is a view schematically illustrating the feedback information and the time sequence for retransmitting the data blocks in the above process. When there are more than one data coded blocks should be transmitted, processing by the data acquisition unit 2053 on the coded block data to be retransmitted, which are stored in the coded block data cache unit 208 or are acquired again, is referred to as division and recombination, which corresponds to Step 1105 in FIG. 5.

When the number of data coded block to be retransmitted is 1, the entire erroneous data block can be retransmitted—this is equivalent to the case in the general HARQ, or it is waited until the number of erroneous data packets is greater than 1 to then perform division and recombination for retransmission.

Dividing mode of the data blocks can be agreed upon by the receiving and transmitting parties, and can also be determined by the transmitting end itself and then notified to the receiving end. The format notification unit 2054 notifies the receiver of the parts extracted from the coded blocks as well as combination of these parts (Step 1110). Both the format notification unit 2054 and Step 1110 are optional rather than compulsory.

Different dividing modes of the data blocks during retransmission are further described below. Taking the situation as shown in FIG. 9 for example, set the bit sequence of the coded block CB12 as $\{b_{10}, b_{11}, b_{12}, b_{13}, b_{14}, b_{15}\}$ and the bit sequence of the coded block CB13 as $\{b_{20}, b_{21}, b_{22}, b_{23}, b_{24}, b_{25}\}$, then the divided and combined CB22 can either $\{b_{10}, b_{11}, b_{12}, b_{23}, b_{24}, b_{25}\}$ or $\{b_{10}, b_{21}, b_{12}, b_{23}, b_{14}, b_{25}\}$, i.e., bits of the first half of CB12 and the latter half of CB 13 are combined and cross-combined. Other dividing and combining modes can also be employed, for instance, to form $\{b_{13}, b_{14}, b_{15}, b_{20}, b_{21}, b_{22}\}$, etc.

In one embodiment, regardless of how many coded blocks are checked to be erroneous, one third of the data of the coded blocks checked to be erroneous is taken to be retransmitted. That is to say, if three coded blocks are checked to be erroneous, one third of the data of each of the three coded blocks checked to be erroneous are extracted, and these data form new sub-packets to be retransmitted. Obviously, it is possible for persons skilled in the art to adjust the proportion of the data extracted from the coded blocks checked to be erroneous and to be retransmitted upon practical circumstances. For instance, it is possible to extract one half, a quarter or one fifth thereof.

Moreover, proportions of the data extracted from each of the coded blocks checked to be erroneous and to be retransmitted can be different from one another. Taking the situation in which three coded blocks are checked to be erroneous as example, it is possible to take one half, one third and one sixth of the data of the coded blocks checked to be erroneous, respectively. This may be determined in accordance with reliability information fed back from the receiving end. In addition, when lengths of the coded blocks in a packet are different from one another, it is possible to carry out extraction of different proportions in accordance with the difference in lengths; for instance, to extract less data from a coded block having a larger length and to extract more data from a coded block having a smaller length, and vice versa.

In another embodiment, regardless of how many coded blocks checked to be erroneous are fed back from the receiving end, retransmission is performed each time with one coded block. For instance, if it is fed back that three coded blocks are checked to be erroneous, one third of the data of each of these coded blocks is extracted, whereas if it is fed back that four coded blocks are checked to be erroneous, a quarter of the data of each of these coded blocks is extracted, and so on.

Furthermore, the dividing mode can be determined with reference to reliability information fed back from the receiver. In one embodiment for example, the receiver determines, before decoding, which section of bits has low reliability according to the magnitude of the value of bit soft information of a coded block, and feeds back the information to the transmitting end (transmitter). Soft information is an input parameter of a soft-in soft-out decoder, and expresses reliability of each bit of a coded block with a real number; the greater the absolute value of the number is, the higher is the reliability; the length of the soft information is equal to the output bit number of the coder; typical soft information measurement is for instance the log-likelihood ratio LLR value, and can also be expressed in other modes such as constellation point distance, etc., but with the same meanings. The transmitting end performs division and retransmission with respect to the positional information of the feed-back soft information to obtain better incorporation gain, but this of course increases overhead of the feedback link. Taking the aforementioned coded blocks as example, if the soft information of the first half bits has lower reliability (lower LLR absolute value) during first transmission of CB12, whereas the soft information of the latter half bits of CB13 has lower reliability, the transmission mode of $\{b_{10}, b_{11}, b_{12}, b_{23}, b_{24}, b_{25}\}$ is preferable. At this time, if a coded block has relatively larger bits with lower reliability of soft information, the proportion of the parts extracted from this coded block can be increased.

Additionally, it is not the fixed section of the coded block checked to be erroneous that is retransmitted during each retransmission, as it is possible to make adjustment in accordance with practical circumstances. For instance, different sections can be selected in accordance with whether it is the odd-number retransmission or even-number retransmission. Taking the situation in which it is fed back that two coded blocks are checked to be erroneous as example, the first half sections of the two erroneous coded blocks are retransmitted in the odd-number retransmission, while the latter half sections of the two erroneous coded blocks are retransmitted in the even-number retransmission. Taking also the situation in which a coded block checked to be erroneous has already been retransmitted for many times (so as to be greater than a predetermined threshold value) as example, the amount of data to be retransmitted of the coded block can be increased.

There are many modes for dividing and recombining the data blocks (coded blocks or data packets), and the gist of these modes rests in that the same information is transmitted in the corresponding bit positions of the retransmitted data block and the first transmitted data block. It is thus possible to incorporate the soft information and bring about incorporation gain as long as the receiving end knows the positional information of each bit in the transmitted coded block corresponding to the previously transmitted coded block. Accordingly, when MCS or the size of the coded block is changed, soft information of the corresponding positions can be incorporated as long as the receiving end can find out the corresponding bit positions of the retransmitted data and the previously transmitted data. When MCS or the length of the coded block is changed, transmission of the positional information of the retransmitted bits causes more link overhead, thus affecting enhancement of system throughput.

As should be stressed here, although in the above description it is exemplified with the coded blocks of one data packet being erroneous (as illustrated in FIG. 9), the present invention is not restricted thereby. The coded blocks checked to be erroneous as described above can be coded blocks checked to be erroneous in different data packets of the single frame, in which case, the transmitting end can perform division and retransmission on the two erroneous data coded blocks.

In another situation, the receiver only feeds back the check result of the data packets in the frame. In this situation the data packets in the frame may not be coded according to coded blocks, as in the situation exemplified in FIG. 2. At this time, the transmitting end cannot know which blocks in the packet are erroneous. In this case, division and retransmission can be performed with the data packet as unit, thus also making it possible to refine the particle size of retransmission.

Figure 10:
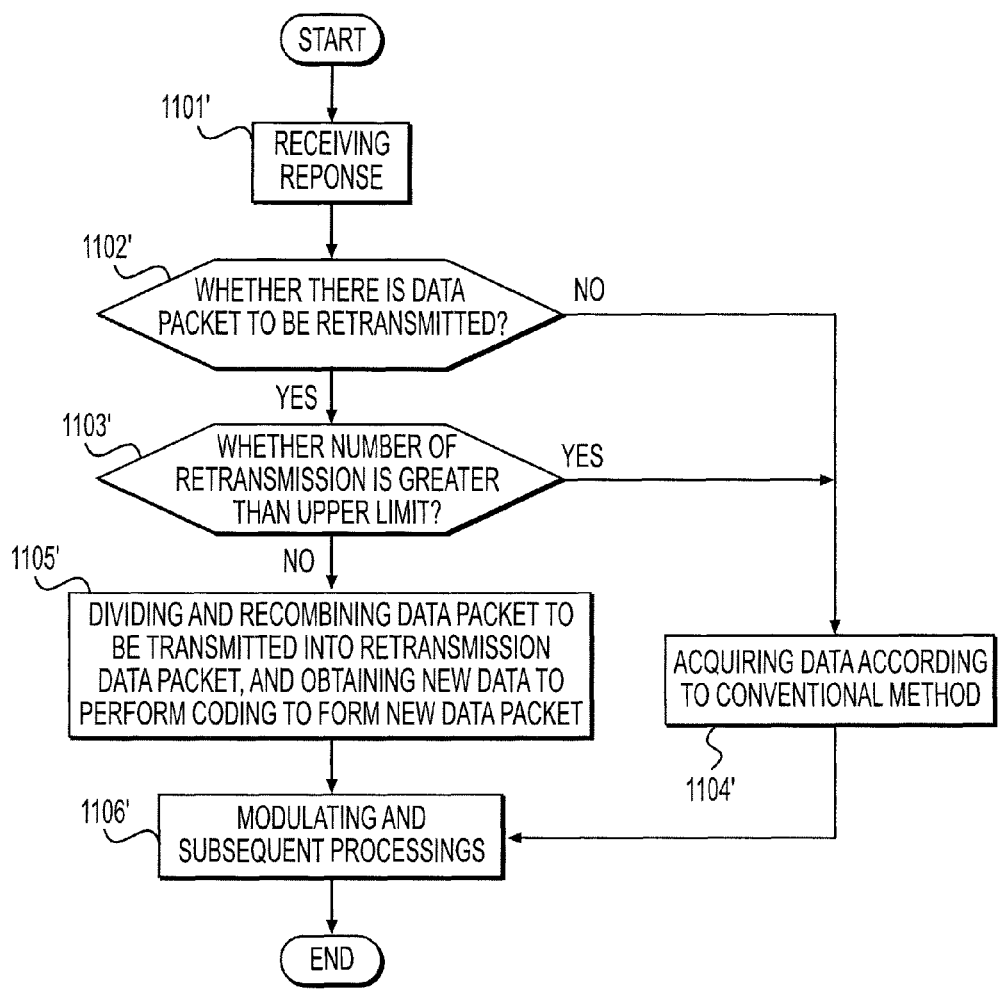
FIG. 10 is a flowchart schematically illustrating the retransmission processing method at the transmitter according to another embodiment of the present invention.

FIG. 10 is a flowchart schematically illustrating the retransmission processing method at the transmitter according to another embodiment of the present invention.

At this time as shown in FIG. 10, the ACK/NACK information as fed back from the receiver is firstly received in Step 1101', and the ACK/NACK information as fed back from the receiver only contains check information of data packets in the frame. It is then judged in Step 1102' whether there is data packet to be retransmitted: if yes (YES in Step 1102'), it is further judged whether the predetermined number of retransmission has been exceeded (Step 1103'). If the predetermined number of retransmission has been exceeded, data is acquired in Step 1104' according to conventional method, namely to acquire new data and pack the data. If the predetermined number of retransmission is not exceeded, parts of each of the data packets to be retransmitted are acquired in Step 1105', these parts are combined to form one or more retransmission data packets, and are modulated and subsequently processed together with other new data packets in Step 1106'. Similar to the cases in FIGS. 7 and 8, it is possible in Step 1105' either to directly extract specific parts of the data packets to be retransmitted from the storage unit that stores the coded retransmission data packets, or to firstly acquire again the data packets to be retransmitted according to the source data of the data packets to be retransmitted, and then extract specific parts from the data packets to be retransmitted as acquired again.

Through division and recombination it is possible to reduce the number of the retransmitted data packets to be less than the number of the data packets not correctly received as determined in accordance with the feedback from the receiving end.

Dividing format and position of the retransmitted data can be notified to the receiving end at the downlink control signaling, by which time the uplink feedback link has low overhead but the downlink occupies certain resources. Selection can be flexibly made here on demand of services. In the TDD system for instance, a frame of downstream data includes signaling, pilot frequency and load data, of which the signaling section is generally controlled to be received and decoded prior to the data, the dividing format and position of the retransmitted data is then obtained according to the signaling coding scheme agreed upon in advance, and the subsequent corresponding data is then performed with the operations of division and incorporation.

The mode by which the transmitter (the format notification unit 2054, for instance) notifies the receiving end of the dividing format and position of the retransmitted data in the downlink control signaling is as described below, for example.

Taking the situation as shown in FIGS. 2 and 3 in which one frame has four data packets and each data packet includes four coded blocks as example, with regard to the technical solution where one half of the data is extracted from each erroneous coded block to be incorporated with a coded block, the notification can for instance employ the following fields:

| Bits 0-3 | Bits 4-7 | Bits 8-11 | Bits 12-13 |
|---|---|---|---|
| Position of the coded block to be retransmitted | Number of the first erroneous coded block | Number of the second erroneous coded block | Coding format<br>00: first half parts of the previous coded block incorporated sequentially with latter half parts of the next coded block, for instance: $\{b_{10}, b_{11}, b_{12}, b_{23}, b_{24}, b_{25}\}$<br>01: latter half parts of the previous coded block incorporated sequentially with first half parts of the next coded block, for instance: $\{b_{13}, b_{14}, b_{15}, b_{20}, b_{21}, b_{22}\}$<br>10: the previous coded block cross-combined with the next coded block, for instance: $\{b_{10}, b_{21}, b_{12}, b_{23}, b_{14}, b_{25}\}$<br>11: first half parts of the previous coded block cross-combined sequentially with first half parts of the next coded block, for instance: $\{b_{13}, b_{20}, b_{14}, b_{21}, b_{15}, b_{22}\}$ |

If the solution is more complicated or the solution contains more options, the corresponding fields will also be more complicated. Persons skilled in the art can adjust the format of the notification upon practical demand.

Similar coding formats are applicable in both the TDD system and the FDD system. In the TDD system, signaling and data can be transmitted at different timings in a downlink time period. In the FDD system, signaling is transmitted simultaneously with the data over a dedicated frequency band.

Moreover, different dividing and incorporating modes can be agreed upon in advance by the receiving and the transmitting parties, and a set of stationary codes is used to indicate the retransmission packet position and coding scheme corresponding to retransmission in one data packet. For instance, when the four coded blocks as shown in FIG. 8 are divided and retransmitted, in addition to using four bits to indicate the ACK/NAK signals of the corresponding data block, four feedback bits are added to indicate the dividing format desired by the receiving end, for instance, {1110} indicates that the transmitting end places retransmitted data in two blocks, wherein the first half parts of the two erroneous coded blocks are retransmitted at odd-number transmission, and the latter half parts of the two erroneous blocks are retransmitted at even-number retransmission; {1101} indicates that the retransmitted data is placed in the first block, while other operations are the same as those in the previous item, and so on. It is thus possible for the receiving end to complete division and incorporation without signaling information upon receipt of the retransmitted data. This method saves resources of the downlink control signaling, but the overhead of the uplink feedback information is relatively great, as more feedback bits are required to indicate the division and positional information desired by the receiving end.

Figure 11:
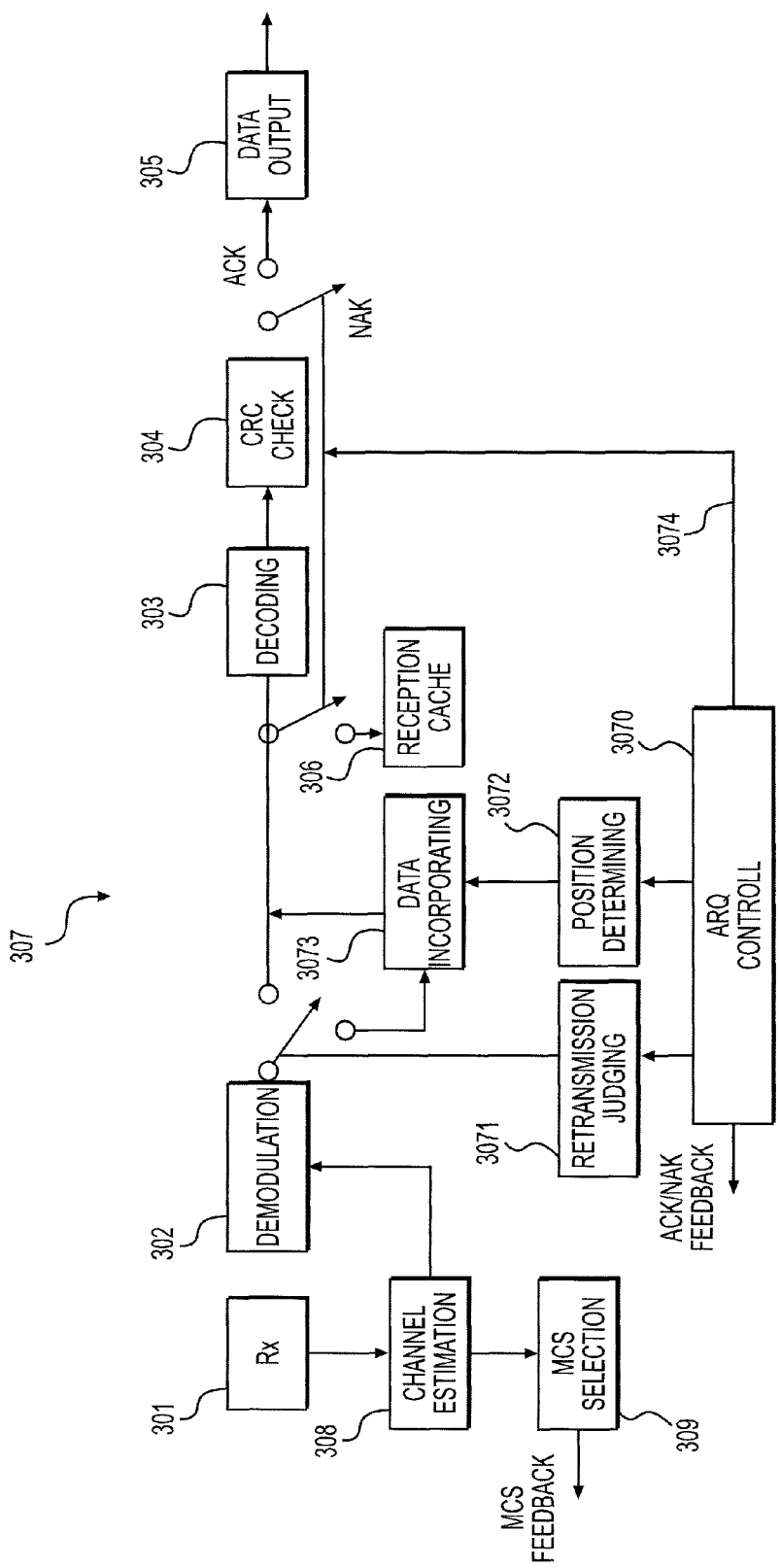
FIG. 11 is a structural view illustrating the HARQ receiver according to one embodiment of the present invention.

FIG. 11 is a structural view schematically illustrating the receiver according to one embodiment of the present invention. As shown in FIG. 11, in the receiver section according to one embodiment of the present invention, the reception antenna 301 firstly receives data, the channel estimation unit 308 then performs channel estimation in accordance with pilot frequency or training sequence, and the MCS controller 309 calculates the proper modulation and coding scheme in accordance with the channel information and feeds the same back to the transmitting end. On the other hand, the demodulating unit 302 demodulates the data. Prior to decoding of the demodulated data by the decoder 303, the retransmission data judging unit 3071 of the ARQ controlling unit 307 determines whether the current data is new data or retransmitted data, and this can either be done according to instruction of the downlink signaling section or according to the ACK/NAK sequence as stored at the receiving end. If it is the new data, the data is directly decoded and performed with CRC check; if it is retransmitted data, the position judging unit 3072 determines the position and coding scheme of retransmission, the data incorporation unit 3073 finds out the data of the corresponding position in the reception cache 306 for soft information incorporation, and the same is then supplied to the decoder 303. The decoder 303 decodes the received new data or the incorporated data, and the CRC check unit 304 performs CRC check on the decoded bits. If it is checked as correct, the ACK signal is fed back and the data correctly received is outputted; otherwise, the NAK signal is fed back, and the bit soft information before decoding of the current data block is stored in the reception cache sequence, as shown by the control switch 3074 in FIG. 11.

FIG. 12 shows incorporation operation at the receiving end. With regard to the situation of retransmission as shown in FIG. 9, the retransmitted coded block CB22 is firstly divided into the two parts of CB22a and CB22b as shown in FIG. 12, the corresponding bit positions of the sub-block CB22a and CB12 are performed with soft information incorporation, and the sub-block CB22b and CB13 are performed with soft information incorporation. MCS is not changed during retransmission, and incorporation of the corresponding bits is also relatively simple, namely by adding the LLR values of the corresponding bits. The incorporated coded blocks are expressed as CB12' and CB13' to be respectively supplied to the decoder for decoding. It is supposed in FIG. 12 that CB22a and CB22b are respectively the first half parts of CB12 and CB13, and their lengths precisely form a complete coded block. Such incorporation can effectively reduce error rate, and can achieve partial retransmission of the coded block. As compared with HARQ technology in FIG. 2 in which the entire data packet is retransmitted, the division and retransmission are carried out in the same time period, thus making it possible to transmit more data.

The aforementioned incorporating mode is obvious to the CC (Chase Combining), and this method is also applicable to the IR (incremental redundancy) mode, as it is possible to divide and retransmit the redundant bit information of each coded block to be retransmitted. To IR mode, this is also equivalent to the structure of dynamically adjusting the code rate. Different dividing proportions will further refine the particle size of retransmission. The dividing criterion of the present invention is the fact that the bit positions of the retransmitted data and the original data correspond to one another on a one-by-one basis, and it suffices, during incorporation soft information at the receiving end, to add the soft information of the corresponding positions.

If the retransmitted data still cannot be correctly received, the data can be retransmitted for several times. The format of the data retransmitted for the second time can be selected by agreement of the receiving and transmitting parties, and can also be notified by the transmitting end to the receiving end via signaling. When the channel condition is so extremely bad that the number of retransmission reaches a certain upper limit, the data packet will be discarded.

When each coded block forms an independent modulation sequence at the transmitting end, it is also possible to perform the division and retransmission operations on the coded block with the modulation symbol as the unit. In this case, the receiving end performs symbol incorporation.

The HARQ coded block incorporating method can perform incorporation based on the bit soft information (LLR), and can also perform Chase Combining on the modulation symbol. If the latter is employed, the retransmitted data consists of modulated symbols, and the receiving end performs incorporation prior to demodulation.

The present invention proposes a method and an apparatus for hybrid automatic retransmission (HARQ) based on data coded block division. The method deletes redundancy of or divides the coded block to be retransmitted to form a new coded block for retransmission. The receiving end performs reverse operations for incorporation and reception. The method refines the granular size of HARQ-retransmitted data, and is capable of further enhancing system throughput and making easier the processing and signaling control of the receive. The codes in the data coded blocks in this paper can be turbo codes (CTC), convolutional codes (CC) or low density check codes (LDPC).

The feedback information of the aforementioned HARQ system can be the ACK/NACK signals of each coded block and the entire data packet, and can also include more information, such as the position of the coded block whose bit LLR value is smaller than a predetermined threshold value, so that it is possible for the transmitting end to perform selective division and combination on the retransmitted data.

The aforementioned HARQ method can operate in the uplink and the downlink of a communications system, and is applicable to both the TDD mode and the FDD mode.

The invention claimed is:

1. An automatic retransmission controller used in a transmitter in an automatic retransmission system including the transmitter and a receiver, said transmitter transmitting to the receiver a frame including a plurality of data packets, each said data packet including two or more coded data blocks, each said coded data block having a check for the coded data block itself, said receiver determining whether each said coded data block as a whole is correctly received based on said check and feeding back an information showing whether each of the coded data blocks as a whole is correctly received, said automatic retransmission controller comprising:

a responsive reception unit that receives the information fed back from the receiver;

a retransmission judging unit that determines coded data blocks to be retransmitted according to the information received by the responsive reception unit; and a data acquisition unit that acquires a part of data in each of the coded data blocks to be retransmitted judged by the retransmission judging unit for combination to form one retransmission coded block, when there are two or more coded data blocks to be retransmitted, wherein the retransmission coded block has the same size as that of another coded data block in a frame comprising the retransmission coded block, and the data acquisition unit determines proportions of the part of data acquired from each of the coded data blocks to be retransmitted to the corresponding data block according to reliability information fed back from the receiver or lengths of the coded data blocks.

2. The automatic retransmission controller according to claim 1, characterized in that the data acquisition unit acquires a half, one third or a quarter of the data from each of the coded data blocks to be retransmitted, so as to form the retransmission coded block.

3. The automatic retransmission controller according to claim 1, characterized in that proportions of the part of data acquired by the data acquisition unit from each of the coded data blocks to be retransmitted to the corresponding data block are not completely identical with each other.

4. The automatic retransmission controller according to claim 1, characterized in that the receiver further feeds back an information on the reception reliability for each part of code blocks which have not been correctly received and need to be retransmitted; the data acquisition unit acquires the part of the coded data blocks to be retransmitted which has not been reliably received according to the reception reliability, so as to form the retransmission coded block.

5. The automatic retransmission controller according to claim 1, characterized in that said automatic retransmission controller further comprises a format notification unit that notifies the receiver of the parts of the coded data blocks extracted and combination mode of these parts.

6. The automatic retransmission controller according to claim 1, characterized in that said transmitter and receiver operate in TDD mode or FDD mode.

7. The automatic retransmission controller according to claim 1, wherein said coded data block is coded according to Turbo code, convolution code or LDPC code.

8. The automatic retransmission controller according to claim 1, wherein said data acquisition unit acquires different parts of each of the coded data blocks to be retransmitted according to the numbers of the coded data blocks to be retransmitted and the length of each of the coded data blocks to be retransmitted.

9. An automatic retransmission controller used in a transmitter in an automatic retransmission system including the transmitter and a receiver, said transmitter transmitting to the receiver a frame including a plurality of data packets, each said data packet having a check for the data packet itself, said receiver determining whether each said data packet is correctly received based on said check, feeding back an information showing whether each of the data packets as a whole are correctly received, said automatic retransmission controller comprising:

a responsive reception unit that receives the information fed back from the receiver;

a retransmission judging unit that determines data packets to be retransmitted according to the information received by the responsive reception unit; and a data acquisition unit that acquires a part of data in each of the data packets to be retransmitted judged by the retransmission judging unit for combination to form one retransmission data packet, when there are two or more data packets to be retransmitted, wherein the retransmission data packet has the same size as that of another data packet in a frame comprising the retransmission data packet, and the data acquisition unit determines proportions of the part of data acquired from each of the data packets to be retransmitted to the corresponding data packet according to reliability information fed back from the receiver or lengths of the data packets.

* * * * *